(12) United States Patent
Sasaki

(10) Patent No.: US 6,469,809 B1
(45) Date of Patent: Oct. 22, 2002

(54) IMAGE RECORDING SYSTEM

(75) Inventor: Yoshiharu Sasaki, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/136,962

(22) Filed: Aug. 20, 1998

(30) Foreign Application Priority Data

Aug. 20, 1997 (JP) .............................................. 9-223860

(51) Int. Cl.⁷ ................................................ H04N 1/04
(52) U.S. Cl. .................................. 358/490; 250/317.1
(58) Field of Search ................................ 358/490, 503, 358/525, 1.9; 250/317.1, 318, 316, 317

(56) References Cited

U.S. PATENT DOCUMENTS

| | | | | |
|---|---|---|---|---|
| 5,578,824 A | * | 11/1996 | Koguchi et al. | ............ 250/318 |
| 5,668,588 A | * | 9/1997 | Morizumi | ................... 342/242 |
| 5,761,600 A | * | 6/1998 | Kabushiki | ................... 399/403 |
| 5,960,233 A | * | 9/1999 | Goto | ........................... 399/69 |
| 6,053,495 A | * | 4/2000 | Hara | .......................... 271/263 |
| 6,095,040 A | * | 8/2000 | Ashikagaya | ................ 101/120 |

FOREIGN PATENT DOCUMENTS

| | | | | |
|---|---|---|---|---|
| JP | 4-296594 | 10/1992 | ............ | B41M/5/40 |
| JP | 4-327982 | 11/1992 | ............ | B41M/5/26 |
| JP | 4-327983 | 11/1992 | ............ | B41M/5/26 |

* cited by examiner

*Primary Examiner*—Jerome Grant, II
*Assistant Examiner*—Negussie Worku
(74) *Attorney, Agent, or Firm*—Sughrue Mion, PLLC

(57) ABSTRACT

An image recording system is disclosed. The system comprises a rotatable recording drum on which an image receiving sheet and plural kinds of image recording mediums are mounted, an optical head for recording image information by exposing a laser beam to the image recording mediums while moving in one-dimensional direction at a speed in proportion to the rotation speed of the recording drum, a characteristics input section in which characteristics of the image recording medium is previously inputted, a conversion table storage section in which there is previously stored a conversion table converting the characteristics of the image recording mediums into setup values of parameters with respect to the image recording, and a parameter control section changing the setup values of the parameters based on the conversion table stored in the conversion table storage section in accordance with the kind of the image recording medium.

18 Claims, 6 Drawing Sheets

SQUEEZING ROLLER

LASER BEAM

M   C   Y
K

IMAGE RECORDING SYSTEM

BACKGROUND OF THE INVENTION

1. Technical Field of the Invention

The present invention relates to an image recording system for recording information such as an image, a text, or the like, on a recording medium and in particular to an image recording system for recording the above information using K(black), C(cyan), M(magenta), and Y(yellow) color of toners on the recording medium.

2. Description of the Related Art

An image recording system incorporating the present invention has the following configuration:

(1) An optical head which has a plurality of laser beams, modulates the laser beams on/off as record data, and can be moved in a one-dimensional direction;

(2) a rotatable recording drum on which a recording material is placed;

(3) a recording medium made up of an image receiving sheet and K, C, M, and Y color toner sheets (pastel color toner sheets of gold, silver, brown, gray, etc., called special colors may be used) where laser beam transfer is enabled;

(4) a squeezing step of bringing the image receiving sheet and each color toner sheet into intimate contact with each other before recording of each color (further, a heating or pressurizing step may be executed);

(5) a step of peeling the toner sheet from the image receiving sheet after recording of each color; and (6) a step of transferring four color (K, C, M, and Y) images transferred to the image receiving sheet to recording paper.

(6) may be executed by another machine.

A first problem concerns setting of recording speed. In a conventional image recording system, the recording speed for each of K, C, M, and Y colors is set to a constant value. Thus, for example, solid pixels, discoloration caused by abnormal transfer of a photo-heat conversion layer, a bridge of isolated pixels, halftone dot toner jump, etc., occurs or whole density increases on a highly sensitive toner sheet like K. On the other hand, on a toner sheet having poor sensitivity, thin pixels or lost halftone dots occur or whole density decreases, enough recording energy cannot be provided, and recording as image data cannot be accomplished.

A second problem is the relationship between recording speed and recording start position to record information with toner sheets of different colors. To rotate a recording drum and move an optical head, normally (1) a spiral system wherein the optical head moves continuously at predetermined speed in proportion to the drum rotation speed for recording or (2) an intermittent system wherein the optical head moves by predetermined step distance with one revolution of the drum is adopted. Therefore, if the drum rotation speed is changed, the optical head moving speed and the moving step time also change. To detect an origin point with respect to a moving direction of the optical head, for example, when the optical head moves toward a direction that a recording start point exists after the recording termination of the preceding color, the position at which the optical head passes through a position sensor such as a photo interrupter in the vicinity of the recording start point is recognized as the origin point.

To use toner sheets of different colors to record information, the recording sensitivity varies from one color to another. Thus, if the recording speed is changed in accordance with the toner sheet sensitivity, moving speed of the optical head changes. Resultantly, the speed at which the optical head passes through the origin point sensor also changes. However, since the sensitivity time of the sensor, defined as time between the sensor reacting and outputting a signal, is constant, accurate position information of the optical head cannot be provided due to difference of the moving distance of the optical head during the sensitivity time of the sensor. Since the result as record image data is not produced on an image receiving sheet because of the start position shift caused by changing the recording speed, image defects of registration difference, a color shift, moire, or the like, occur.

A third problem is setting of squeezing speed. A color proof printer requiring high definition and high quality uses toner sheets of different colors. A contactability with an image receiving sheet varies from one toner sheet to another. However, in the conventional image recording system, setting of the squeezing speed is limited to a constant value. Therefore, solid pixels, fog in a non-image area, a bridge of isolated pixels, inverse transfer of an image receiving layer, etc., occurs or whole density increases on a highly sensitive toner sheet. On the other hand, on a toner sheet having poor sensitivity, image unevenness, thin pixels, or lost halftone dots occur or whole density decreases and recording as image data cannot be accomplished.

A fourth problem is setting of squeezing pressure of a squeezing roller. A color proof printer requiring high definition and high quality uses toner sheets of different colors. The contactability with an image receiving sheet varies from one toner sheet to another. However, in the conventional image recording system, setting of the squeezing roller press pressure at the time of squeezing is limited to a constant value. Therefore, solid pixels, fog in a non-image area, a bridge of isolated pixels, inverse transfer of an image receiving layer, etc., occurs or whole density increases on a highly sensitive toner sheet. On the other hand, on a toner sheet having poor sensitivity, image unevenness or thin pixels occur or whole density decreases and recording as image data cannot be accomplished.

A fifth problem is setting of squeezing roller temperature at the squeezing time. A color proof printer requiring high definition and high quality uses toner sheets of different colors. The contactability with an image receiving sheet varies from one toner sheet to another. However, in the conventional image recording system, setting of the squeezing roller temperature at the squeezing time is limited to a constant value. Therefore, solid pixels, fog in a non-image area, a bridge of isolated pixels, inverse transfer of an image receiving layer, etc., occurs or whole density increases on a highly sensitive toner sheet. On the other hand, on a toner sheet having poor sensitivity, image unevenness, thin pixels, or lost halftone dots occur or whole density decreases and recording as image data cannot be accomplished.

SUMMARY OF THE INVENTION

It is therefore an object of the present invention to provide an image recording system which enables color reproduction as image output setting by changing recording process conditions for each color even if the characteristics of C, M, Y, and K color toners used for color print vary delicately.

To achieve the above object, there is provided an image recording system comprising: a rotatable recording drum on which an image receiving sheet and plural kinds of image recording mediums are mounted; an optical head for recording image information by exposing a laser beam to the image recording mediums while moving in one-dimensional direction at a speed in proportion to the rotation speed of the recording drum; a characteristics input section in which characteristics of the image recording medium is previously inputted; a conversion table storage section in which there is previously stored a conversion table converting the characteristics of the image recording mediums into setup values of parameters with respect to the image recording; and a parameter control section changing the setup values of the parameters based on the conversion table stored in the conversion table storage section in accordance with the kind of the image recording medium.

In the system, the parameter control section includes a recording drum rotation speed control section controlling the rotation speed of the recording drum based on the conversion table in accordance with the kind of the image recording medium.

The system further comprises a position sensor detecting the position of the optical head, and a position correction section correcting a position error deriving from a characteristic of the position sensor, wherein the characteristic of the position sensor is previously inputted in the characteristics input section, and wherein the position correction calculates and corrects the position error based on the characteristic of the position sensor inputted in the characteristics input section and the moving speed of the optical head obtained from the recording drum rotation speed control section.

The system further comprises a rotatable squeezing member abutting against the recording drum for providing squeezing pressure to bring the image recording mediums into adhesive contact with the image receiving sheet, wherein the parameter control section includes a squeezing member rotation speed control section controlling the rotation speed of the squeezing member based on the conversion table in accordance with the kind of the image recording medium.

In the system, the parameter control section includes a squeezing pressure control section controlling the squeezing pressure of the squeezing member with respect to the recording drum based on the conversion table in accordance with the kind of the image recording medium.

In the system, the parameter control section includes a temperature control section controlling temperature of the squeezing member with respect to the recording drum based on the conversion table in accordance with the kind of the image recording medium.

In the system, the characteristics of the image recording mediums may be sensitivity characteristics of each of the recording mediums.

DETAILED DESCRIPTION OF THE PREFERRED EMBODIMENTS

Specifically, an image recording system according to a first embodiment changes the rotation speed of the recording drum for each record color, thereby changing the recording speed. At the time, an image recording system according to a second embodiment changes specification of the recording start position in the moving direction of the recording laser head for each record color. An image recording system according to a third embodiment changes the rotation speed of the squeezing roller or the recording drum for each record color. An image recording system according to a fourth embodiment changes the press pressure of the squeezing roller for each record color. An image recording system according to a fifth embodiment changes the temperature of the squeezing roller for each record color.

The preferred ranges of the above-described numeric values are as follows:

(1) The recording speed ranges from 0.5 to 50 m/s, preferably 1 to 13 to m/s;

(2) the peripheral speed of the squeezing roller ranges from 0.01 to 50 m/min, preferably 0.1 to 10 m/minute, more preferably 0.5 to 5 m/minute;

(3) the squeezing roller press pressure ranges from 0.01 to 10 kg/cm, preferably 0.1 to 5 kg/cm; and (4) the squeezing roller temperature ranges from 20° C. to 200° C., preferably 40° C. to 170° C.

Now, descriptions of the preferred embodiments will be given below in detail with reference to the accompanying drawings.

Figure 1:
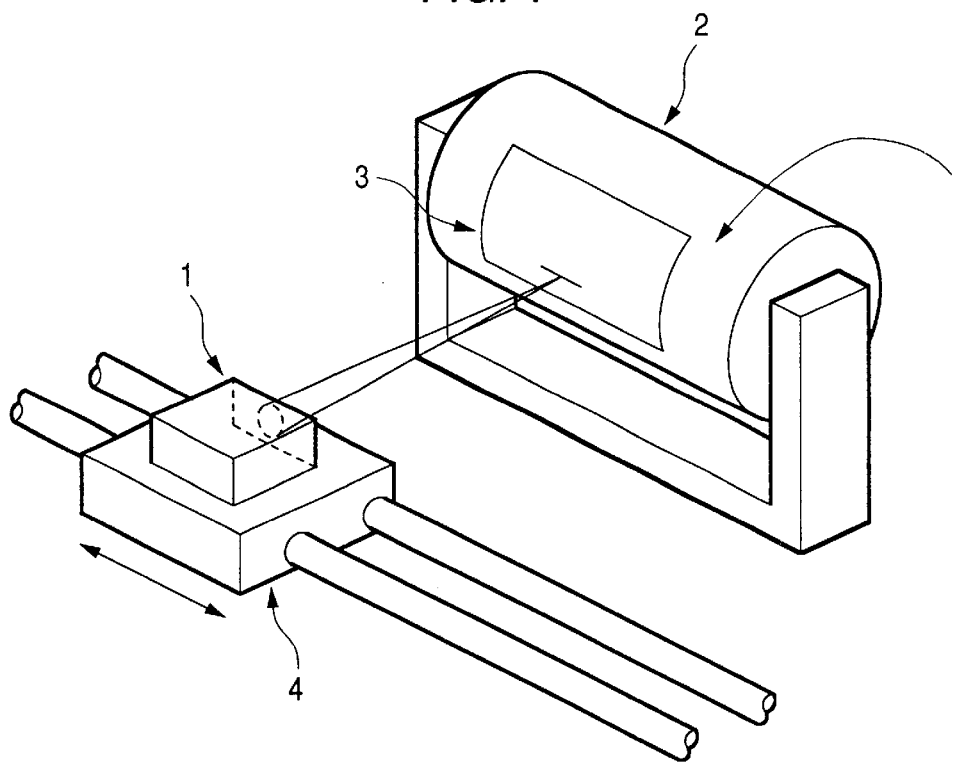
FIG. 1 is a perspective view showing essential members of an image recording system incorporating the present invention.

FIG. 1 is a perspective view to show essential members of an image recording system incorporating the present invention. In the figure, numeral 1 denotes an optical head which has a plurality of laser beams, modulates the laser beams on/off as record data, and can be moved in a one-dimensional direction, and numeral 2 denotes a rotatable recording drum on which a recording material 3 is placed.

The optical head 1 is set on a move stage 4 that can be moved in parallel with the recording drum 2. The movement corresponds to the subscanning direction when an image is formed. The main scanning direction is the rotation direction of the recording drum 2.

Figure 2:
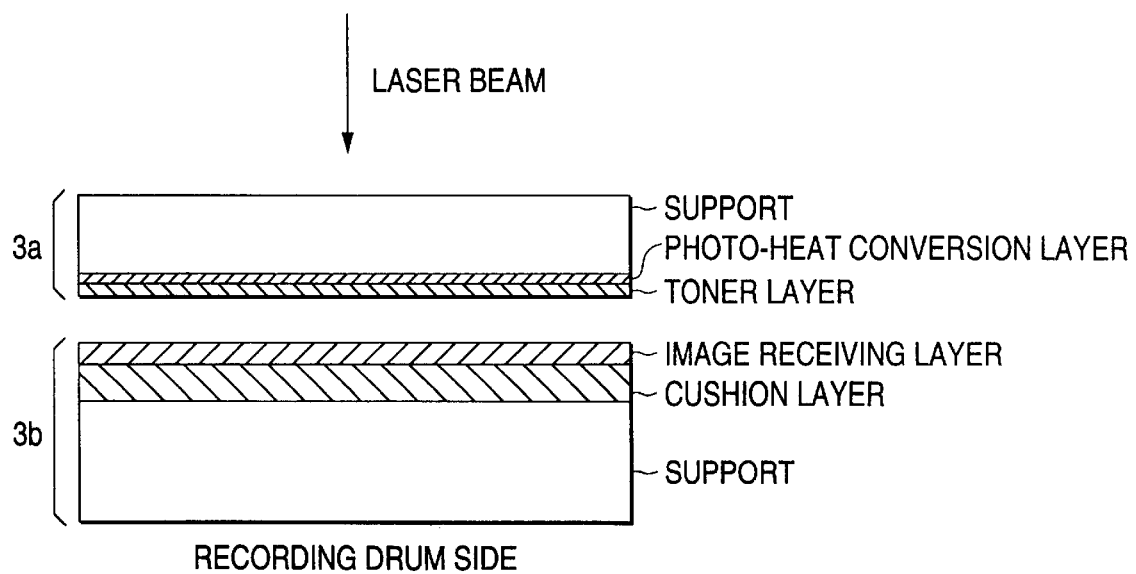
FIG. 2 is an illustration showing structures of an image receiving sheet and a toner sheet.

FIG. 2 is an illustration to show structures of an image receiving sheet and a toner sheet.

A toner sheet 3a is made up of a support, a photo-heat conversion layer, and a toner layer from the laser beam application side. An image receiving sheet 3b is made up of an image receiving layer, a cushion layer, and a support from the toner sheet 3a side. The image receiving sheet 3b is placed on the recording drum 2, the toner sheet 3a is overlaid on the image receiving sheet 3b with the toner layer turned toward the image receiving sheet 3b side, and laser beam is applied from the opposite side of the toner sheet 3a. Then, the toner layer area to which the laser beam is applied is transferred to the image receiving layer by heat.

A substance to allow laser beam to pass through, such as a PET base, a TAC base, or a PEN base, is used as the support.

Material for efficiently converting laser energy into heat, such as carbon, black, infrared absorption pigment, or specific wavelength absorption material, is used as the photo-heat conversion layer.

Toner sheets of colors of K, C, M, and Y are available as the toner layer; in addition, toner sheets of colors of gold, silver, brown, and gray may be used as the toner layer.

The image receiving layer is adapted to receive transferred toner.

The cushion layer absorbs the level difference when a plurality of toners are superposed on each other.

The toner sheet 3a and the image receiving sheet 3b are described in detail in Unexamined Japanese Patent Publication Nos. Hei 4-296594, 4-327982, and 4-327983 as applications of the present applicant.

Figure 3:
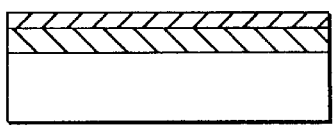
FIGS. 3(a)–3(f) are illustrations showing a recording process for each color of K, C, M, and Y.
Figure 3:
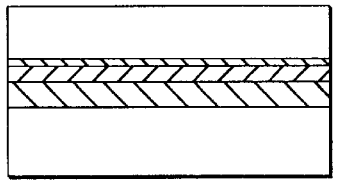
Figure 3:
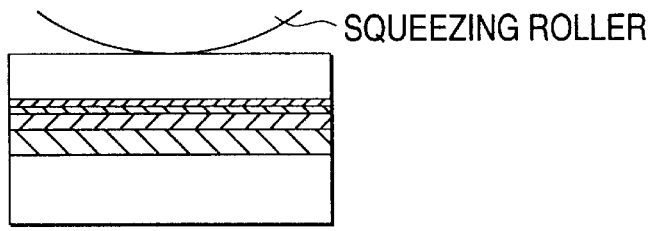
Figure 3:
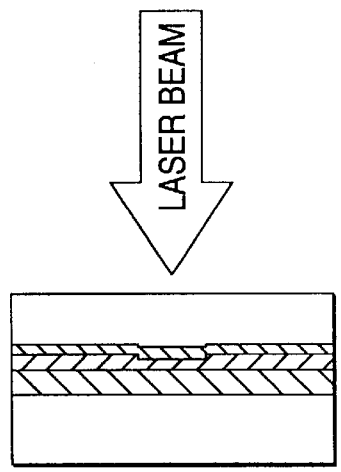
Figure 3:
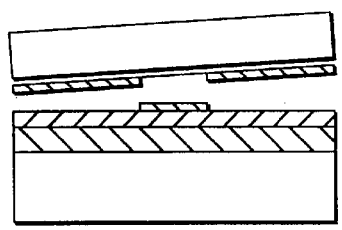
Figure 3:
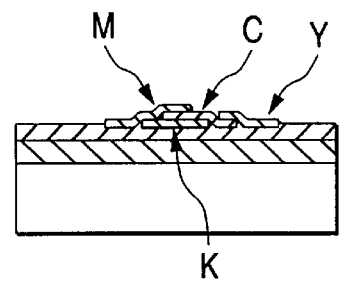

FIGS. 3(a)–3(f) are illustrations showing one example of recording process executing the recording process in FIG. 2 for each color of K, C, M, and Y. The recording process for each color of K, C, M, and Y consists of a squeezing step, a laser recording step based on color data, and a step of peeling a toner sheet from an image receiving sheet after recording as follows:

1) Wind an image receiving sheet on the recording drum as shown in FIG. 3(a);
2) first, to execute K step, wind a K toner sheet on the image receiving sheet as shown in FIG. 3(b);
3) then, cause a squeezing roller (partially shown) to squeeze the K color toner sheet onto the image receiving sheet as shown in FIG. 3(c);
4) apply laser beam for recording based on K image, text data as shown in FIG. 3(d);
5) peel the K toner sheet from the image receiving sheet (end of K step) as shown in FIG. 3(e);
6) next, execute C step, namely, wind a C toner sheet on the image receiving sheet;
7) cause the squeezing roller to squeeze the C color toner sheet onto the image receiving sheet;
8) execute laser recording based on C data;
9) peel the C toner sheet from the image receiving sheet (end of C step);
10) further, execute M step, namely, wind an M toner sheet on the image receiving sheet;
11) cause the squeezing roller to squeeze the M color toner sheet onto the image receiving sheet;
12) execute laser recording based on M data;
13) peel the M toner sheet from the image receiving sheet (end of M step);
14) then, execute Y step, namely, wind a Y toner sheet on the image receiving sheet;
15) cause the squeezing roller to squeeze the Y color toner sheet onto the image receiving sheet;
16) execute laser recording based on Y data;
17) peel the Y toner sheet from the image receiving sheet (end of Y step);
18) four colors of K, C, M, and Y are stacked or not stacked on each other appropriately, forming a necessary color image as shown in FIG. 3(f); and
19) transfer the image to recording paper.

Figure 4:
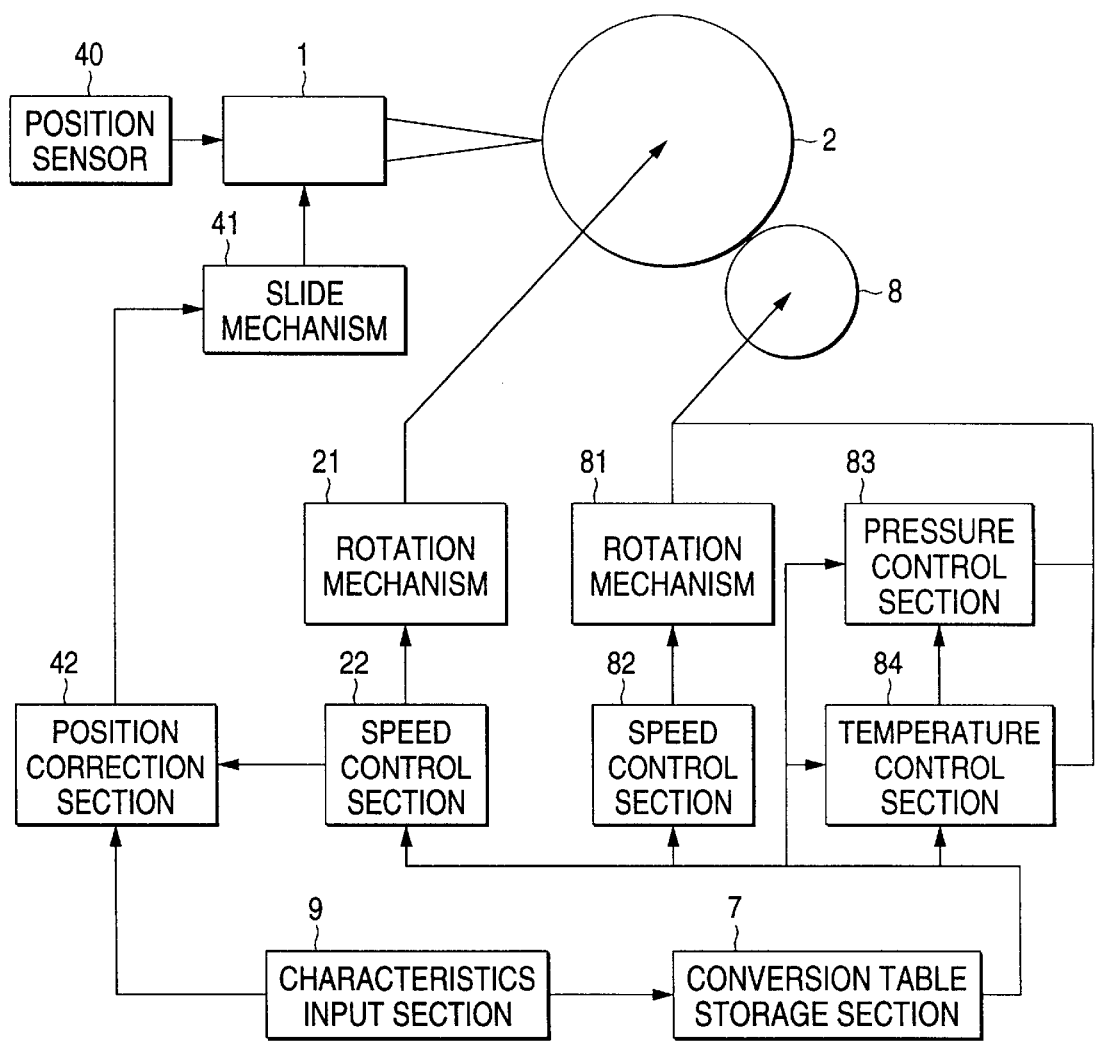
FIG. 4 is a schematic diagram showing a whole configuration of the image recording system according to the present invention.

FIG. 4 is a block diagram showing a whole configuration of the image recording system including each of the embodiments according to the present invention.

In the figure, numeral 9 denotes a characteristics input section capable of inputting previously characteristic values of each of the toner sheets and the position sensor and so on which are utilized in the image recording system. Numeral 7 denotes a conversion table storage section in which there is previously stored a conversion table converting each of the characteristic values inputted in the characteristics input section 9 into each of parameter values which are essential to the image recording. Numeral 21 denotes a rotation mechanism rotating the recording drum 2. Numeral 22 denotes a speed control section connected to the rotation mechanism 21 and controlling the rotation speed of the recording drum 2 in accordance with the values obtained from the conversion table storage section 7. Numeral 40 denotes a position sensor detecting passing of the optical head 1 at a predetermined position. Numeral 41 denotes a slide mechanism shifting the optical head 1. Numeral 42 denotes a position correction section connected to the slide mechanism 41 and correcting the position of the optical head 1 in accordance with the rotation speed information of the recording drum 2 obtained from the speed control section 22 and the characteristic information of the position sensor 40 obtained from the conversion table storage section 7. Numeral 8 denotes a squeezing roller bringing the toner sheet into adhesive contact with the pre-recorded image receiving sheet. Numeral 81 denotes a rotation mechanism rotating the squeezing roller 8. Numeral 82 denotes a speed control section connected to the rotation mechanism 81 and controlling the rotation speed of the squeezing roller 8 in accordance with the values obtained from the conversion table storage section 7. Numeral 83 denotes a pressure control section controlling squeezing pressure of the squeezing roller 8 in accordance with the values obtained from the conversion table storage section 7. Numeral 84 denotes a temperature control section controlling temperature of the squeezing roller 8 in accordance with the values obtained from the conversion table storage section 7.

Specifically, an image recording system according to a first embodiment of the present invention changes the rotation speed of a recording drum for each record color for changing the recording speed. High-power laser is used for recording and an image needs to be output in a short time as much as possible, thus normally laser output is performed as the maximum output. If toner sheets having comparatively high sensitivity are used as K, C, M, and Y toner sheets, comparatively high-speed recording needs to be executed; if toner sheets having comparatively poor sensitivity are used, comparatively low-speed recording needs to be executed. Then, the image recording system is adapted to be able to change the recording speed in accordance with the toner sheet sensitivity for recording.

The sensitivity characteristics of each of the utilized toner sheets are previously inputted into the characteristics input section 9. The conversion table storage section 7 determines proper rotation speed of the recording drum 2 with respect to each toner sheets. The speed control section 22 controls the rotation mechanism 21 in accordance with the rotation speed value determined by the conversion table storage section 7, and thereby changes the rotation speed of the recording drum 2 in each toner sheet process.

The recording speed ranges from 0.5 to 50 m/s and preferably about 1 to 13 m/s.

According to the embodiment, the recording speed is changed in accordance with the toner sheet sensitivity for recording and resultantly, for the image after recording, (1) a problem such that solid pixels, discoloration caused by abnormal transfer of the photo-heat conversion layer, a bridge of isolated pixels, halftone dot toner jump, etc., occurs, that whole density increases, or that the recording speed slows down at the recording time on a toner sheet having comparatively high sensitivity can be solved;

(2) a problem such that thin pixels or lost halftone dots occur, that recording as image data cannot be accomplished, or that whole density decreases at the recording time on a toner sheet having comparatively poor sensitivity can be solved; and (3) further, as a whole, inconsistencies in density can be solved and color difference from setup color, ΔE, can be reduced.

Figure 6:
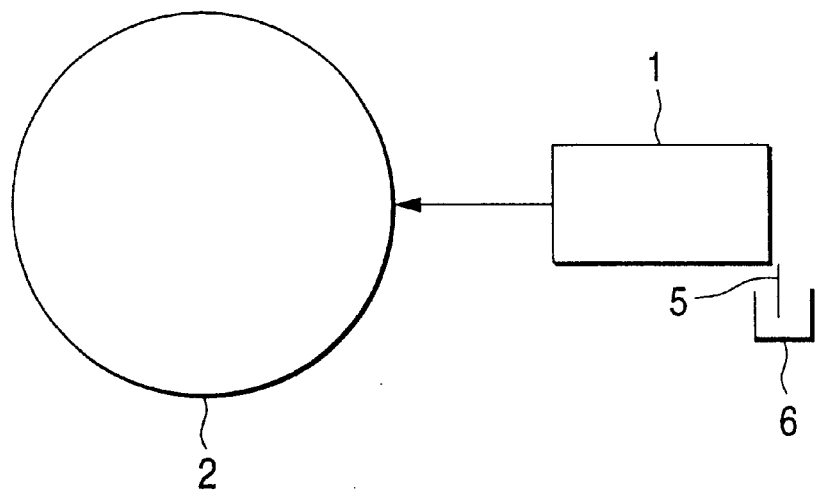
FIGS. 6(a) and 6(b) are illustrations showing position detection mechanism.
Figure 6:
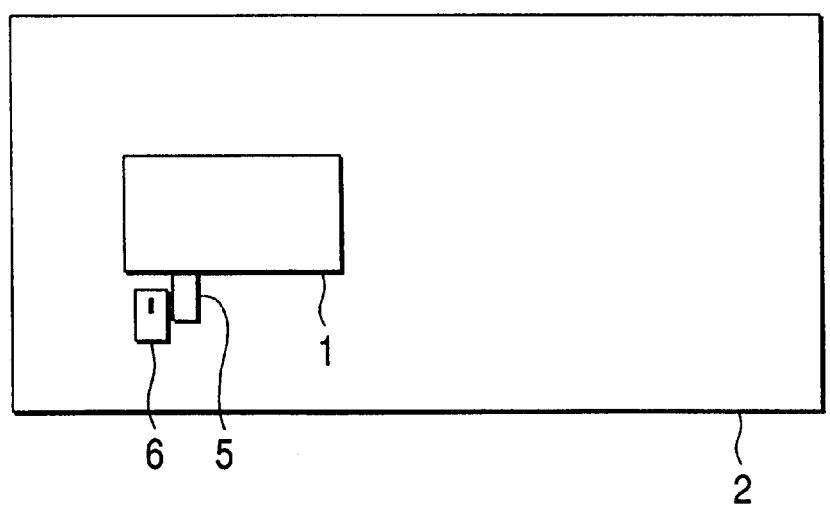
Figure 7:
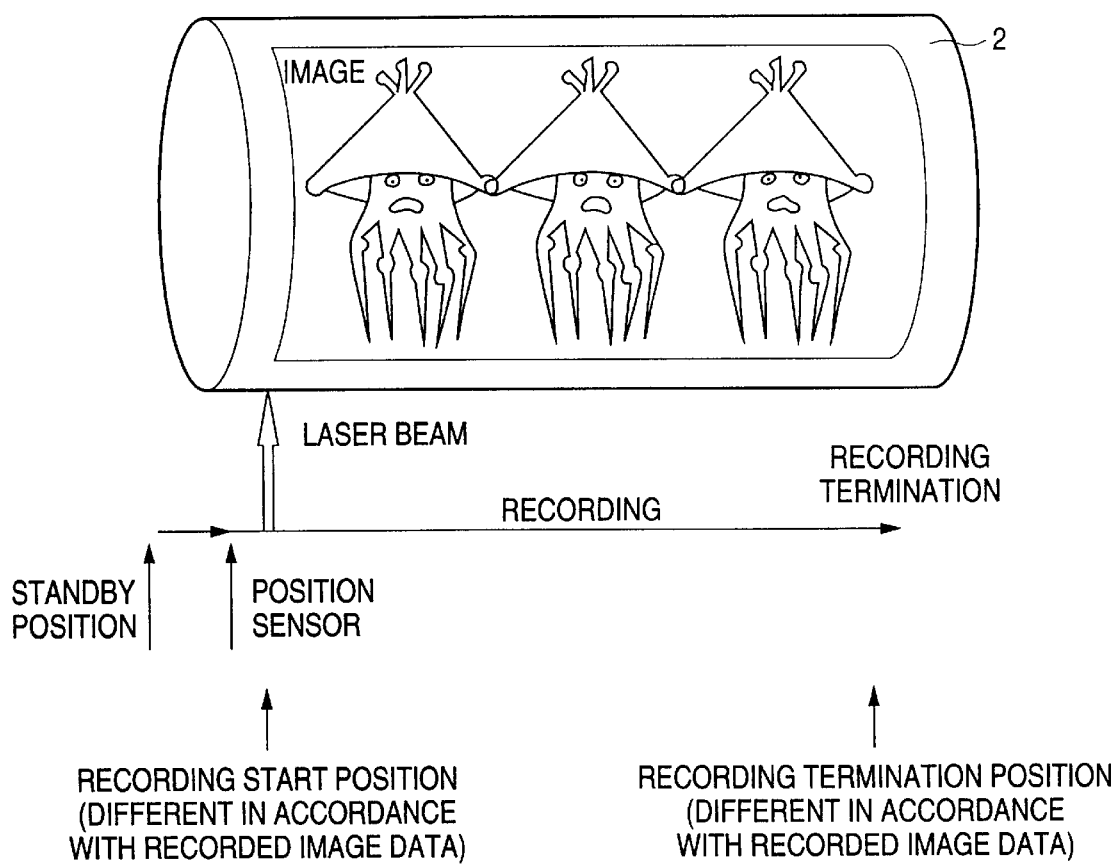
FIG. 7 is an illustration showing a system in which determination of the origin point of the optical head in response to moving speed at the time to start recording.

To detect the position of the optical head, for example, a shutter bar 5 and a photo interrupter 6 are used in combination, as shown in FIGS. 6(*a*) and 6(*b*). FIG. 6(*a*) is a side view of a drum and the optical head and FIG. 6(*b*) is a rear view thereof.

The shutter bar 5 is projected from the optical head. The photo interrupter 6 is angular U-shaped in cross section having an opening on the top. Light is emitted toward a light reception element from one side of the angular U shape to the opposite side and is shut as the shutter bar 5 passes through, whereby the position is detected. Of course, the position may be detected by a magnetic sensing method or a limit switch as well as the photo interrupter.

Even if the position of the position sensor 40 is defined as an origin point with respect to moving direction of the optical head 1, there would be difference between the defined origin point and an origin point recognized by the system due to time lag which derives from the sensitivity time of the position sensor 40. Namely, the amount of difference derives from the moving distance of the optical head 1 during the sensitivity time.

Specifically, now suppose a desired recording start position $x_0$, and the above-mentioned position shift $x_1$, thereby an actual recording start position is $(x_0-x_1)$. If the position shifts are same with respect to all the toner sheet recording process, there would not be a serious problem in a resultantly obtained image. However, since the moving speed of the optical head 1 changes in proportion to the rotation speed of the recording drum 2, if the rotation speed is changed with respect to each toner sheet process, different amounts of the position shift are appear in each toner sheet and thereby a color shift is occurred. Therefore, it is necessary to recognize the position shift and to correct it in each toner sheet recording process exactly.

In an image recording system according to a second embodiment of the present invention, the position shift caused by changing the rotation speed of the recording drum 2 is previously grasped.

Specifically, as described above, the moving speed of the optical head 1 is proportion to the rotation speed of the recording drum 2. Hence, information regarding the moving speed of the optical head 1 can be obtained from the speed control section 22. And information regarding the sensitivity of the position sensor 40 is previously stored in the characteristics input section 9. The moving distance of the optical head 1 during the sensitivity time of the sensor 40 can thereby be calculated based on the information. The position correction section 42 executes the calculation and correct the position shift based on the result of the calculation. Accordingly, correct recording start position can be obtained in each toner sheet recording process.

To determine the starting position of the optical head in the moving direction thereof, the following two systems are possible.

Figure 5:
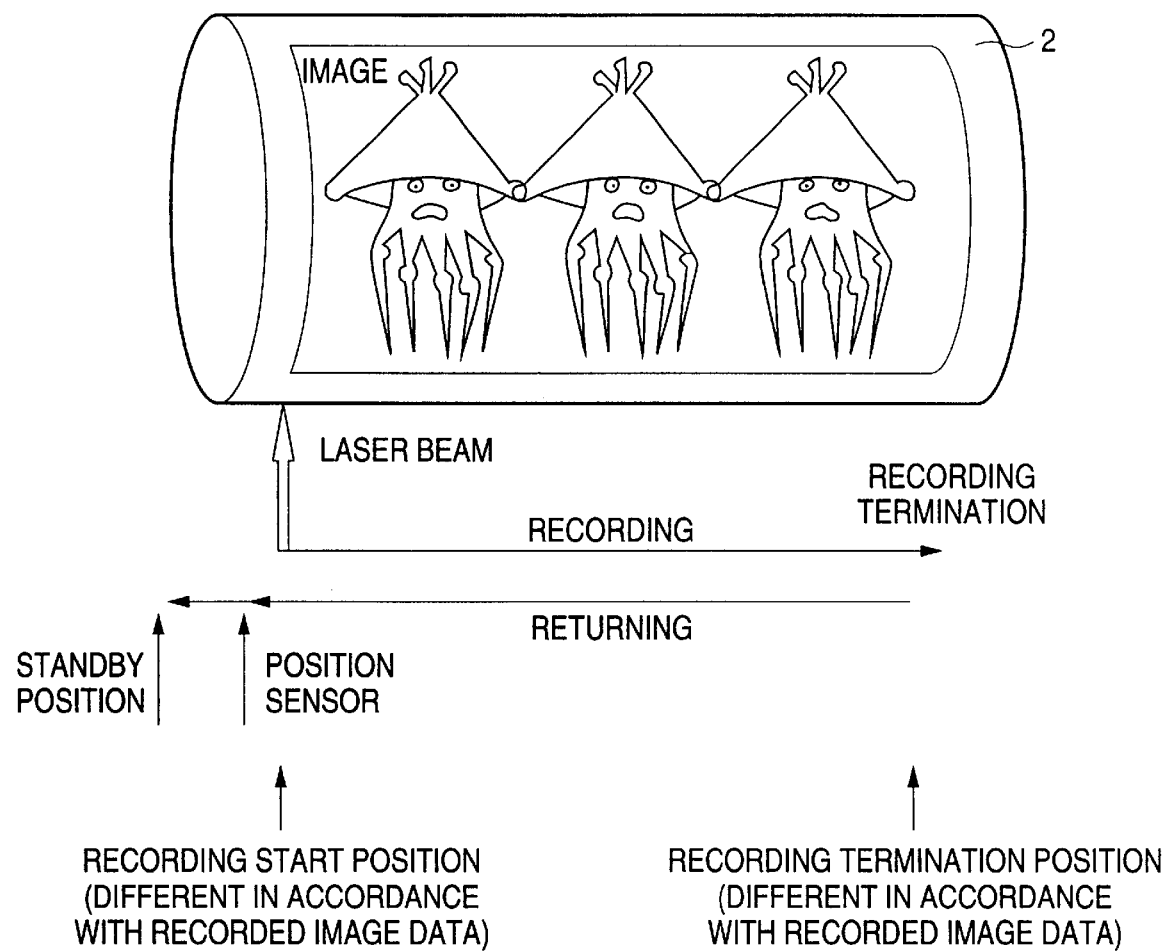
FIG. 5 is an illustration showing a system in which determination of an origin point of an optical head in response to returning speed of the optical head.

FIG. 5 shows a system wherein the optical head passes through the position sensor after the recording termination of the preceding color. Specifically, the optical head is positioned at a standby position located left portion of FIG. 5 at first, namely, in a standby state. When the recording is started, the optical head moves from left to right of the figure and returns from right to the standby position after the recording termination, then on the way of returning, the optical head passes through the position sensor, the position shift is occurred at the time. In the system, the position correction for the origin point of the next color is executed with reference to the returning speed information in the preceding toner sheet recording process.

FIG. 6 shows a system wherein-when the optical head passes through the position sensor before the recording start. In the system, the position correction for the origin point of the present color is executed with reference to the present moving speed information.

According to the embodiment, the recording start position shift is corrected, whereby the result as record image data can be produced on an image receiving sheet and occurrence of image defects such as registration difference, a color shift, moire, etc., can be prevented.

An image recording system according to a third embodiment of the present invention can deal with the relationship between a recording drum and a squeezing roller wherein the former is a driven part and the latter is a drive part or wherein the former is a drive part and the latter is a driven part.

Since used color materials and binders of K, C, M, and Y toner sheets vary delicately, the contactability between an image receiving layer and a toner layer varies depending on the rotation speed of the squeezing roller. To squeeze the second or later color toner sheet onto the image receiving sheet, the state of the image receiving layer changes due to the effect of squeezing the preceding color toner sheet, thus it is necessary to squeeze the color toner sheet onto the image receiving sheet at the speed matched with the state of the image receiving layer. Then, the present embodiment enables the rotation speed of the squeezing roller or the recording drum to be changed with respect to each of the toner sheet.

Specifically, the sensitivity characteristics of each of the utilized toner sheets are previously inputted into the characteristics input section 9. The conversion table storage section 7 determines proper rotation speed of the squeezing roller 5 with respect to each toner sheets. The speed control section 82 controls the rotation mechanism 81 in accordance with the rotation speed value determined by the conversion table storage section 7, and thereby changes the rotation speed of the squeezing roller 5 in each toner sheet process. At the time, it may be configured that the rotation speed of the recording drum 2 is changed by controlling the rotation mechanism 21 via the speed control section 22.

According to the embodiment, it is made possible to change the rotation speed of the squeezing roller or the recording drum in accordance with the toner sheet, whereby the contact state between the toner sheet and the image receiving sheet can be optimized. Resultantly, for the image after recording, (1) a problem such that solid pixels, fog in a non-image area, a bridge of isolated pixels, inverse transfer of the image receiving layer, etc., occurs or that whole density increases due to excessive contact with a highly sensitive toner sheet can be solved; and (2) a problem such that image unevenness, thin pixels, lost halftone dots, or abnormal transfer of photo-heat conversion image occurs, that whole density decreases, or that recording as image data cannot be accomplished due to contact failure with a toner sheet having poor sensitivity can be solved.

In an image recording system according to a fourth embodiment of the present invention, used color materials and binders of K, C, M, and Y toner sheets vary delicately, thus the contact degree between an image receiving layer and a toner layer varies depending on the press pressure of a squeezing roller. To squeeze the second or later color toner sheet onto the image receiving sheet, the state of the image receiving layer changes due to the effect of squeezing the preceding color toner sheet, thus it is necessary to squeeze the color toner sheet onto the image receiving sheet at the speed matched with the state of the image receiving layer. Then, the present embodiment enables the press pressure of the squeezing roller against a recording drum to be changed in accordance with the toner sheet.

Specifically, the sensitivity characteristics of each of the utilized toner sheets are previously inputted into the characteristics input section 9. The conversion table storage section 7 determines proper squeezing pressure of the squeezing roller 5 with respect to each toner sheets. The pressure control section 83 controls the squeezing pressure of the squeezing roller 5 in accordance with the squeezing pressure value determined by the conversion table storage section 7.

According to the embodiment, it is made possible to change the press pressure of the squeezing roller against the recording drum in accordance with the toner sheet, whereby the contact state between the toner sheet and the image receiving sheet can be optimized. Resultantly, (1) a problem such that solid pixels, fog in a non-image area, a bridge of isolated pixels, inverse transfer of the image receiving layer, etc., occurs or that whole density increases due to excessive contact with a highly sensitive toner sheet can be solved; and (2) a problem such that image unevenness, thin pixels, lost halftone dots, or abnormal transfer of photo-heat conversion image occurs, that whole density decreases, or that recording as image data cannot be accomplished due to contact failure with a toner sheet having poor sensitivity can be solved.

In an image recording system according to a fifth embodiment of the present invention, used color materials and binders of K, C, M, and Y toner sheets vary delicately, thus the contact degree between an image receiving layer and a toner layer varies depending on the temperature of a squeezing roller.

To squeeze the second or later color toner sheet onto the image receiving sheet, the state of the image receiving layer changes due to the effect of squeezing the preceding color toner sheet. Thus it is necessary to squeeze the color toner sheet onto the image receiving sheet at the temperature matched with the state of the image receiving layer. Then, the present embodiment enables the temperature of the squeezing roller to be changed with respect to each of the toner sheet.

Specifically, the sensitivity characteristics of each of the utilized toner sheets are previously inputted into the characteristics input section 9. The conversion table storage section 7 determines proper temperature of the squeezing roller 5 with respect to each toner sheets. The temperature control section 84 controls the temperature of the squeezing roller 5 in accordance with the temperature value determined by the conversion table storage section 7.

According to the embodiment, it is made possible to change the temperature of the squeezing roller in accordance with the toner sheet, whereby the contact state between the toner sheet and the image receiving sheet can be optimized. Resultantly, (1) a problem such that solid pixels, fog in a non-image area, a bridge of isolated pixels, inverse transfer of the image receiving layer, etc., occurs or that whole density increases due to excessive contact with a highly sensitive toner sheet can be solved; and (2) a problem such that image unevenness, thin pixels, lost halftone dots, or abnormal transfer of photo-heat conversion image occurs, that whole density decreases, or that recording as image data cannot be accomplished due to contact failure with a toner sheet having poor sensitivity can be solved.

It is contemplated that any modifications may be made to the system of the present invention without departing from the spirit and scope of the invention.

For example, a method of relatively executing main scanning and subscanning by fixing the optical head and sliding the recording drum in FIG. 1 may be adopted. The process of transferring four color images of K, C, M, and Y transferred to the image receiving sheet to recording paper may be executed by a different device from the system, such as a laminator.

As has been described heretofore, according to the present invention, the image recording system is configured that the rotation speed of the recording drum, the moving speed of the optical head, the rotation speed of the squeezing roller, the squeezing pressure of the squeezing roller, and the temperature of the squeezing roller can be changed in accordance with the characteristics of the toner sheets using the image recording. Accordingly, if toner sheets having different characteristics such as the sensitivity are used, color image information, text information, etc., of high quality with no color unevenness can be recorded.

What is claimed is:

1. An image recording system comprising:
    a rotatable recording drum on which an image receiving sheet and plural kinds of image recording mediums are mounted;
    an optical head for recording image information by exposing a laser beam to the image recording mediums while moving in one-dimensional direction at a speed in proportion to the rotation speed of the recording drum;
    a characteristics input section through which characteristics of the image recording medium is inputted;
    a conversion table storage section in which there is previously stored a conversion table converting the characteristics of the image recording mediums into setup values of parameters with respect to the image recording; and
    a parameter control section changing the setup values of the parameters based on the conversion table stored in the conversion table storage section in accordance with the kind of the image recording medium.

2. The image recording system as set forth in claim 1, wherein the parameter control section includes a recording drum rotation speed control section controlling the rotation speed of the recording drum based on the conversion table in accordance with the kind of the image recording medium.

3. The image recording system as set forth in claim 2 further comprising:
    a position sensor detecting the position of the optical head; and
    a position correction section correcting a position error deriving from a characteristic of the position sensor,
    wherein the characteristic of the position sensor is previously inputted in the characteristics input section, and
    wherein the position correction calculates and corrects the position error based on the characteristic of the position sensor inputted in the characteristics input section and the moving speed of the optical head obtained from the recording drum rotation speed control section.

4. The image recording system as set forth in claim 1 further comprising:

a rotatable squeezing member abutting against the recording drum for providing squeezing pressure to bring the image recording mediums into adhesive contact with the image receiving sheet, wherein the parameter control section includes a squeezing member rotation speed control section controlling the rotation speed of the squeezing member based on the conversion table in accordance with the kind of the image recording medium.

5. The image recording system as set forth in claim 4, wherein the parameter control section includes a squeezing pressure control section controlling the squeezing pressure of the squeezing member with respect to the recording drum based on the conversion table in accordance with the kind of the image recording medium.

6. The image recording system as set forth in claim 4, wherein the parameter control section includes a temperature control section controlling temperature of the squeezing member with respect to the recording drum based on the conversion table in accordance with the kind of the image recording medium.

7. The image recording system as set forth in claim 1, wherein the characteristics of the image recording mediums are sensitivity characteristics of each of the recording mediums, and wherein the parameter control section changes the setup values of the parameters in accordance with the sensitivity characteristics of the image recording mediums.

8. The image recording system according to claim 7, wherein the parameter control section includes a recording drum rotation speed control section controlling the rotation speed of the recording drum based on the conversion table in accordance with the sensitivity characteristics of the image recording medium.

9. The image recording system according to claim 8, wherein a rotation speed of the recording drum ranges from 1 to 13 m/s.

10. The image recording system according to claim 8, further comprising:

a position sensor detecting the position of the optical head; and a position correction section correcting a position error deriving from a characteristic of the position sensor, wherein the characteristic of the position sensor is previously inputted in the characteristics input section, and wherein the position correction calculates and corrects the position error based on the characteristic of the position sensor inputted in the characteristics input section and the moving speed of the optical head obtained from the recording drum rotation speed control section.

11. The image recording system according to claim 10, wherein the position sensor comprises a shutter bar projected from the optical head and a photo interrupter.

12. The image recording system according to claim 7 further comprising:

a rotatable squeezing member abutting against the recording drum for providing squeezing pressure to bring the image recording mediums into adhesive contact with the image receiving sheet, wherein the parameter control section includes a squeezing member rotation speed control section controlling the rotation speed of the squeezing member based on the conversion table in accordance with the sensitivity characteristics of the image recording medium.

13. The image recording system according to claim 12, wherein the pressure of the squeezing member abutting the recording drum ranges from 0.1 to 5 kg/cm.

14. The image recording system according to claim 12, wherein the parameter control section includes a temperature control section controlling temperature of the squeezing member with respect to the recording drum based on the conversion table in accordance with the kind of the image recording medium.

15. The image recording system according to claim 12, wherein a speed of the squeezing member ranges from 0.5 to 5 m/min.

16. The image recording system as set forth in claim 1, wherein the parameter control section changes the setup values of the parameters in accordance with the color of each of the image recording mediums.

17. The image recording system according to claim 16, wherein the parameter control section includes a recording drum rotation speed control section controlling the rotation speed of the recording drum based on the conversion table in accordance with the color of each image recording medium.

18. The image recording system according to claim 16 further comprising:

a rotatable squeezing member abutting against the recording drum for providing squeezing pressure to bring the image recording mediums into adhesive contact with the image receiving sheet, wherein the parameter control section includes a squeezing member rotation speed control section controlling the rotation speed of the squeezing member based on the conversion table in accordance with the color of each image recording medium.

* * * * *